US011933673B2

(12) United States Patent
Sasagawa et al.

(10) Patent No.: US 11,933,673 B2
(45) Date of Patent: Mar. 19, 2024

(54) HEAT SOURCE DETECTION DEVICE

(71) Applicant: IHI Corporation, Koto-ku (JP)

(72) Inventors: Chiharu Sasagawa, Tokyo (JP); Takashi Ogai, Tokyo (JP)

(73) Assignee: IHI Corporation, Koto-ku (JP)

( * ) Notice: Subject to any disclaimer, the term of this patent is extended or adjusted under 35 U.S.C. 154(b) by 871 days.

(21) Appl. No.: 16/970,537

(22) PCT Filed: Feb. 19, 2019

(86) PCT No.: PCT/JP2019/006110
§ 371 (c)(1),
(2) Date: Aug. 17, 2020

(87) PCT Pub. No.: WO2019/160161
PCT Pub. Date: Aug. 22, 2019

(65) Prior Publication Data
US 2020/0408601 A1   Dec. 31, 2020

(30) Foreign Application Priority Data

Feb. 19, 2018   (JP) ................. 2018-027194

(51) Int. Cl.
*G01J 5/00*   (2022.01)

(52) U.S. Cl.
CPC ............. *G01J 5/007* (2013.01); *G01J 5/0066* (2013.01); *G01J 2005/0077* (2013.01)

(58) Field of Classification Search
CPC .. G01J 5/007; G01J 5/0066; G01J 2005/0077; G01J 5/00; G06T 2207/10036; G06T 2207/20021; G06T 2207/30192; G06T 2207/30232; G06T 7/0002; G08B 17/005; G08B 17/12

See application file for complete search history.

(56) References Cited

U.S. PATENT DOCUMENTS 5,153,563 A  * 10/1992 Goto ................ G08B 17/12
                                                    236/49.2
2013/0129147 A1   5/2013 Zavagli et al.
2016/0132714 A1   5/2016 Pennypacker et al.

FOREIGN PATENT DOCUMENTS

| CN | 106017690 A | * | 5/2016 |
| CN | 106023203 A |   | 10/2016 |
| CN | 106503480 A |   | 3/2017 |
| JP | 6-4780 A    |   | 1/1994 |

(Continued)

OTHER PUBLICATIONS

International Search Report dated Apr. 2, 2019 in PCT/JP2019/006110 filed on Feb. 19, 2019, 1 page.

*Primary Examiner* — Tung S Lau
(74) *Attorney, Agent, or Firm* — Oblon, McClelland, Maier & Neustadt, L.L.P.

(57) ABSTRACT

A heat source detection device is a heat source detection device that detects a heat source on the earth using observation data of a radiometer provided in a geostationary satellite and includes: a calculation unit that calculates a heat source proportion value indicating a proportion of a wavelength distribution due to the heat source included in the observation data to the observation data by curve fitting using Planck's law; and a determination unit that determines presence or absence of the heat source according to the heat source proportion value calculated by the calculation unit.

7 Claims, 6 Drawing Sheets

(56) References Cited

FOREIGN PATENT DOCUMENTS

| | | |
|---|---|---|
| JP | 6-259675 A | 9/1994 |
| JP | 8-240623 A | 9/1996 |
| JP | 2003-296702 A | 10/2003 |
| JP | 4003869 B | 11/2007 |

\* cited by examiner

HEAT SOURCE DETECTION DEVICE

TECHNICAL FIELD

The present disclosure relates to a heat source detection device.

The present application is a U.S. national stage entry of PCT/JP2019/006110, filed Feb. 19, 2019, which claims priority to Japanese Patent Application No. 2018-027194, filed Feb. 19, 2018, the content of which is incorporated herein by reference.

BACKGROUND

Conventionally, a method of detecting forest fires on the earth by monitoring hot spots (heat sources) using observation data obtained from a low-orbit satellite has been disclosed (for example, refer to Patent Document 1).

DOCUMENT OF RELATED ART

Patent Document

[Patent Document 1] Japanese Unexamined Patent Application, First Publication No. 2003-296702

SUMMARY

Technical Problem

However, the observation data obtained from a low-orbit satellite has a low time resolution. Accordingly, even if a forest fire occurs, the forest fire will be detected half a day to one day after the occurrence of the fire, and detection of the fire may be delayed. Therefore, since the observation data obtained from a geostationary satellite has a higher time resolution than that of a low-orbit satellite, it is conceivable to perform fire detection using this observation data. However, the observation data obtained from a geostationary satellite has a low spatial resolution, and it may be difficult to identify small-scale fires.

The present disclosure is made in view of such circumstances, and an object thereof is to provide a heat source detection device that can detect small-scale fires at an early stage.

Solution to Problem

A first aspect of the present disclosure is a heat source detection device that detects a heat source on the earth using observation data of a radiometer provided in a geostationary satellite, the heat source detection device including: a calculation unit that calculates a heat source proportion value indicating a proportion of a wavelength distribution due to the heat source included in the observation data to the observation data by curve fitting using Planck's law; and a determination unit that determines presence or absence of the heat source according to the heat source proportion value calculated by the calculation unit.

A second aspect of the present disclosure is that in the heat source detection device of the first aspect, the calculation unit calculates, as the heat source proportion value, a proportion of a wavelength distribution depending on a temperature of a heat source by a fire with flames to the observation data, and a proportion of a wavelength distribution depending on a temperature of a heat source by a fire only with smoke to the observation data.

A third aspect of the present disclosure is that the heat source detection device of the first or second aspect further includes: a storage unit that stores, in time series, heat source proportion values calculated by the calculation unit, and the determination unit determines that the heat source is present when a change rate of the heat source proportion values in time series stored in the storage unit exceeds a threshold value.

A fourth aspect of the present disclosure is that in the heat source detection device of the third aspect, the determination unit calculates an average value in a fixed interval obtained by averaging, for each fixed interval, the heat source proportion values in time series stored in the storage unit and determines that the heat source is present when a change rate of the calculated average value exceeds a threshold value.

A fifth aspect of the present disclosure is that in the heat source detection device of the first aspect, the calculation unit sets a first wavelength distribution D1, a second wavelength distribution D2 and a third wavelength distribution D3 based on predetermined temperatures determined according to a flaming state, a smoldering state and a background, respectively, calculates coefficients a, b and c satisfying a radiance G of the observation data=aD1+bD2+cD3 using a non-linear least squares method and sets the heat source proportion value to a/(a+b+c), b/(a+b+c) or c/(a+b+c).

A sixth aspect of the present disclosure is that in the heat source detection device of the fifth aspect, the calculation unit calculates an esf by performing curve fitting using the non-linear least squares method, and until a difference between a radiance based on the calculated esf and the radiance G of the observation data converges on a fixed value or less, while adjusting the predetermined temperatures, the calculation unit repeats this procedure.

Effects

According to the present disclosure, it is possible to detect small-scale fires at an early stage.

DESCRIPTION OF EMBODIMENTS

Hereinafter, a heat source detection device of an embodiment of the present disclosure will be described with reference to the drawings.

Figure 1:
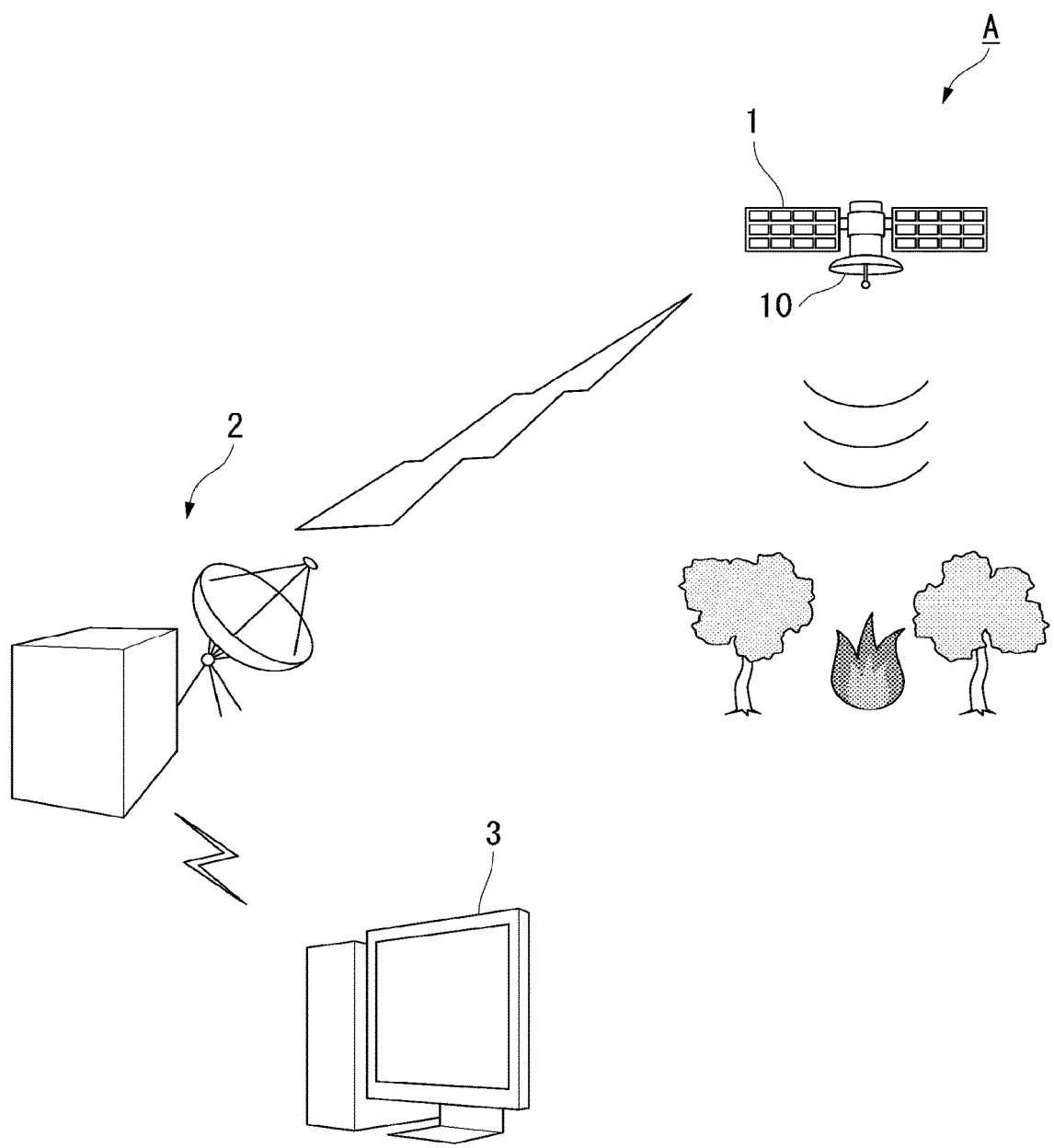
FIG. 1 is a diagram showing an example of a schematic configuration of a heat source detection system including a heat source detection device of an embodiment of the present disclosure.

FIG. 1 is a diagram showing an example of a schematic configuration of a heat source detection system A including a heat source detection device 3 of the embodiment of the present disclosure. The heat source detection system A is a system that detects heat sources on the earth.

As shown in FIG. 1, the heat source detection system A includes a geostationary satellite 1, a data center 2 and the heat source detection device 3.

The geostationary satellite 1 is a satellite placed in a geostationary orbit at an altitude of about 36000 km above the equator and revolves at the same cycle as the rotation of the earth. For example, the geostationary satellite 1 is a geostationary meteorological satellite "Himawari". The geostationary satellite 1 is provided with a visible and infrared radiometer 10 and can measure a radiance (observation data) in a predetermined wavelength band (observation band) for each fixed period. This fixed period is the measurement period of the visible and infrared radiometer 10.

For example, the visible and infrared radiometer 10 can measure observation data in the range visible from the geostationary satellite 1 at a measurement period of 10 minutes.

Therefore, the geostationary satellite 1 can obtain observation data having a higher time resolution than that of a low-orbit satellite (a satellite orbiting the earth at an altitude of several hundred kilometers from the ground). When the geostationary satellite 1 obtains observation data, the geostationary satellite 1 transmits the obtained observation data to the data center 2 on the earth.

The data center 2 is placed on the earth. The data center 2 receives and manages the observation data transmitted from the geostationary satellite 1. For example, the data center 2 is a public or private organization that releases observation data (weather data).

The heat source detection device 3 is a device that detects heat sources on the earth based on the observation data obtained from the geostationary satellite 1 via the data center 2. For example, the heat sources include a heat source by a fire (for example, forest fire), an eruption or the like. Therefore, the heat source detection device is significant in a case where it is difficult to detect a fire in a place or the like where there are no people (or few people). In this embodiment, a case where the heat source detection device 3 detects the presence or absence of a fire will be described.

For example, when the heat source detection device 3 detects a fire in a forest, the heat source detection device 3 determines whether or not the detection target thereof is in a state where a fire is occurring (hereinafter, referred to as a "firing state") or a state where no fire is occurring (hereinafter, referred to as a "background"). Here, the firing state includes a state of a fire with flames (hereinafter, referred to as a "flaming state") and a state where a fire only with smoke is occurring (hereinafter, referred to as a "smoldering state"). The smoldering state is a state where white smoke is generated by flameless combustion (so-called smolder) that occurs in the initial state of fire or a state where black smoke is generated by incomplete combustion. Note that a state where flames cannot be observed from the geostationary satellite 1 due to generated smoke although a fire with the flames is occurring may be included in the "smoldering state".

Therefore, the heat source detection device 3 determines whether or not the detection target is in the flaming state or the smoldering state based on the observation data obtained from the geostationary satellite 1 and determines that a fire is occurring when the detection target is in the flaming state or the smoldering state. However, the observation data obtained from the geostationary satellite 1 has a lower spatial resolution than that of observation data obtained from the low-orbit satellite, and it may be difficult to determine the presence or absence of small-scale fires. Accordingly, one of the features of this embodiment is that information (information indicating the flaming state, the smoldering state and the background) having a higher resolution than the above spatial resolution can be extracted from the observation data obtained from the geostationary satellite 1 by curve fitting using Planck's law. Thereby, the heat source detection device 3 can detect a small-scale fire in the initial stage based on the observation data obtained from the geostationary satellite 1.

Figure 2:
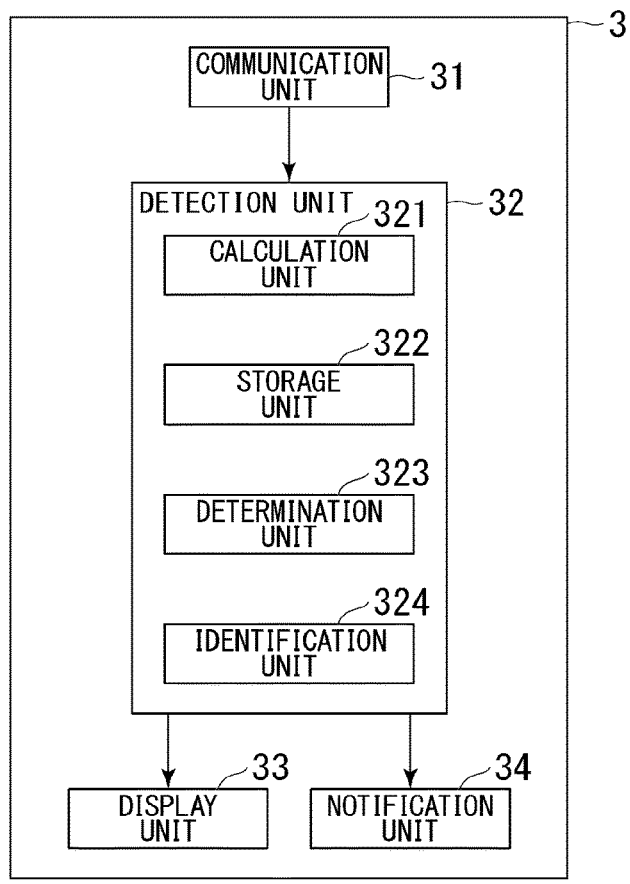
FIG. 2 is a diagram showing an example of a schematic configuration of the heat source detection device of the embodiment of the present disclosure.

Hereinafter, a schematic configuration of the heat source detection device 3 of the embodiment of the present disclosure will be specifically described. FIG. 2 is a diagram showing an example of a schematic configuration of the heat source detection device 3 of the embodiment of the present disclosure.

As shown in FIG. 2, the heat source detection device 3 includes a communication unit 31, a detection unit 32, a display unit 33 and a notification unit 34.

The communication unit 31 transmits and receives information by communicating with the data center 2. For example, the communication network between the communication unit 31 and the data center 2 may be a wireless communication transmission path or a combination of a wireless communication transmission path and a wired communication transmission path. In addition, this communication network may be a mobile communication network such as a mobile phone network, a wireless packet communication network, the Internet, a leased line, or a combination thereof.

The detection unit 32 obtains observation data from the data center 2 through the communication unit 31. Then, the detection unit 32 determines the presence or absence of the firing state based on the obtained observation data. Here, the observation data will be described.

The observation data has, for each pixel, information on wavelengths and information on radiance (radiant emission). Therefore, the detection unit 32 obtains, for each pixel, the wavelength information and the radiance information. The radiance in one pixel corresponds to data of electromagnetic waves radiated from a specific area (hereinafter, referred to as a "detection area") of the detection target (for example, a forest). Therefore, when the firing state is detected from the observation data of a pixel, it shows that a fire is occurring in the detection area corresponding to the pixel. Note that the area of the surface of the earth corresponding to one pixel in the observation data is, for example, 2×2 km.

When a fire occurs in the detection area, it is known that the peak wavelength of the radiance moves to the short wavelength side due to Wien's displacement law. Therefore, the peak wavelength of the radiance obtained when the detection area is in the firing state further moves to the short wavelength side than the peak wavelength of the radiance obtained in the background. In addition, when it is in the firing state, the flaming state and the smoldering state have different heat source temperatures, and the flaming state has a higher heat source temperature than that of the smoldering state. Therefore, the peak wavelength of the radiance obtained when the detection area is in the flaming state further moves to the short wavelength side than the peak wavelength of the radiance obtained in the smoldering state. Consequently, when the peak wavelengths of the radiances of the flaming state, the smoldering state and the background are represented by $\lambda_1$, $\lambda_2$ and $\lambda_3$, respectively, the relationship the peak wavelength $\lambda_1$<the peak wavelength $\lambda_2$<the peak wavelength $\lambda_3$ is obtained.

However, the above detection area may include at least one of the flaming state, the smoldering state and the background. That is, in the detection area, only the flaming state may be present, or the smoldering state or the background may be present in addition thereto. Therefore, the radiance obtained for each pixel includes at least one wavelength distribution of the wavelength distribution of the flaming state (wavelength distribution having the peak wavelength $\lambda_1$), the wavelength distribution of the smoldering state (wavelength distribution having the peak wavelength $\lambda_2$), and the wavelength distribution of the background (wavelength distribution having the peak wavelength $\lambda_3$). Consequently, the detection unit 32 divides the observation data for each pixel into wavelength distributions of the flaming state, the smoldering state and the background and determines the presence or absence of the wavelength distributions of the flaming state and the smoldering state, thereby performing the fire detection for the detection target.

Hereinafter, functional units for performing the fire detection operation in the detection unit 32 of the embodiment of the present disclosure will be described.

The detection unit 32 includes a calculation unit 321, a storage unit 322, a determination unit 323, and an identification unit 324.

Note that the detection unit 32 is configured of a computer, and this computer includes a central processing unit (CPU), a storage device, an input/output device and the like. The storage device includes one or more of a volatile memory such as a random-access memory (RAM), a non-volatile memory such as a read-only memory (ROM), a hard disk drive (HDD), a solid-state drive (SDS) and the like. The input/output device exchanges signals and data (observation data and the like) with the communication unit 31 through wire or wireless transmission. The computer can perform predetermined functions based on a program or the like stored in the storage device. The detection unit 32 may be configured of one computer, and each of the calculation unit 321, the storage unit 322, the determination unit 323 and the identification unit 324 may be configured as a functional block of the computer, or the calculation unit 321, the storage unit 322, the determination unit 323 and the identification unit 324 may be configured of independent computers, and the computers may be configured to exchange signals and data therebetween.

Figure 3:
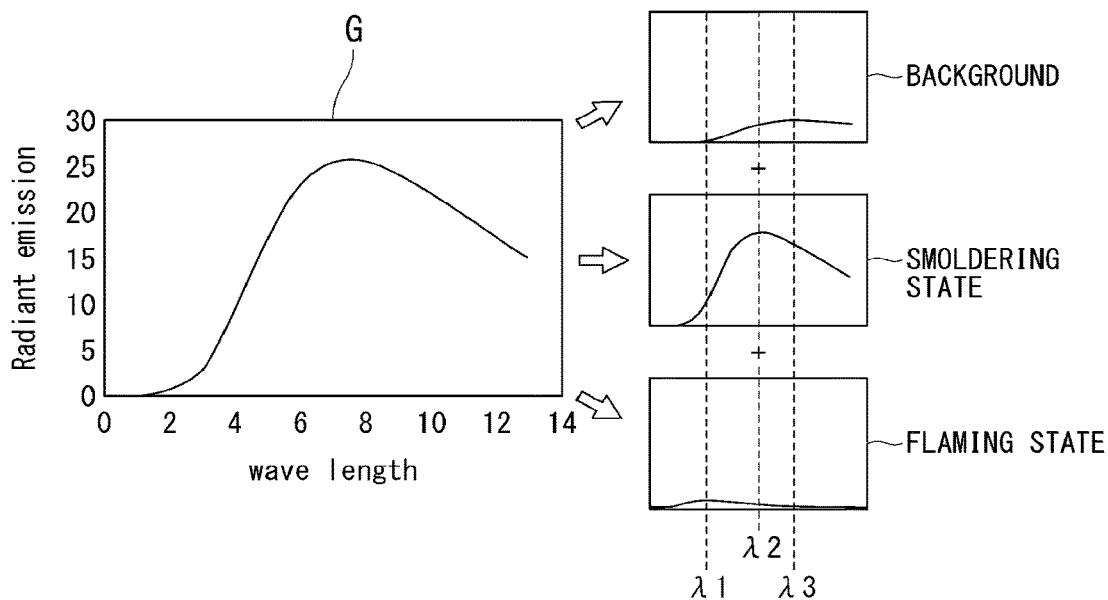
FIG. 3 is a diagram showing a method of calculating proportions, in which wavelength distributions of a flaming state, a smoldering state and a background are included, in a calculation unit of the embodiment of the present disclosure.

The calculation unit 321 obtains observation data from the data center 2 through the communication unit 31. Then, the calculation unit 321 divides the distribution of the radiance wavelength into wavelength distributions of the flaming state, the smoldering state and the background by curve fitting using the characteristic that the wavelength distribution of the radiance of electromagnetic radiation from a black body depends on the temperature according to Planck's law. Specifically, as shown in FIG. 3, the calculation unit 321 calculates proportions, in which the wavelength distributions of the flaming state, the smoldering state and the background are included in the radiance (refer to G in FIG. 3) obtained for each pixel, by curve fitting using Planck's law.

For example, the calculation unit 321 may perform the curve fitting by a non-linear least squares method using Planck's law. In this case, the calculation unit 321 obtains the radiance G (FIG. 3) for each pixel of the observation data from the data center 2 through the communication unit 31, sets, based on Planck's law, a first wavelength distribution D1 (wavelength distribution having the peak wavelength $\lambda_1$), a second wavelength distribution D2 (wavelength distribution having the peak wavelength $\lambda_2$) and a third wavelength distribution D3 (wavelength distribution having the peak wavelength k) based on predetermined temperatures (initial temperature values) determined according to the flaming state, the smoldering state and the background, respectively, calculates coefficients a, b and c satisfying the radiance G=aD1+bD2+cD3 by the non-linear least squares method, and sets a heat source proportion value indicating a proportion of the wavelength distribution due to a heat source included in the observation data to the observation data to a/(a+b+c), b/(a+b+c) or c/(a+b+c). In addition, an esf (emission scaling factor) indicating a proportion of fires in the detection area may be calculated by performing the curve fitting by the non-linear least squares method, and while the above temperatures are optimized based on the calculated esf, the non-linear least squares method may be performed. In other words, the esf may be calculated by performing the curve fitting by the non-linear least squares method using the initial temperature values of the flaming state, the smoldering state and the background, and until a difference between the radiance based on the calculated esf and the radiance G of the observation data converges on a fixed value or less, while the above temperatures are adjusted, this procedure may be repeated. The esf is, for example, a value of 0 or more and 1 or less. The fixed value may be appropriately set in consideration of the needed detection accuracy, the calculation time and the like.

Then, the calculation unit 321 stores the calculated proportions (heat source proportion values) of the wavelength distributions of the flaming state, the smoldering state and the background in the storage unit 322. Note that in the following description, the proportion of the wavelength distribution of the flaming state is referred to as a flaming state proportion value (indicated by a/(a+b+c)), the proportion of the wavelength distribution of the smoldering state is referred to as a smoldering state proportion value (indicated by b/(a+b+c)), and the proportion of the wavelength distribution of the background is referred to as a background proportion value (indicated by c/(a+b+c)).

The storage unit 322 stores, in time series, the flaming state proportion values, the smoldering state proportion values, and the background proportion values calculated for each pixel by the calculation unit 321. That is, the storage unit 322 stores the flaming state proportion values, the smoldering state proportion values, and the background proportion values in time series for each revisit time of the geostationary satellite 1.

The determination unit 323 determines whether or not a heat source is present, that is, whether or not a fire is occurring based on the flaming state proportion value or the smoldering state proportion value. For example, the determination unit 323 determines that a fire is occurring when at least either one proportion value of the flaming state proportion value and the smoldering state proportion value is greater than or equal to a predetermined threshold value. Note that the threshold values for the flaming state proportion value and the smoldering state proportion value may be the same as or be different from each other. In addition, the determination unit 323 may determine that a fire is occurring when both of the flaming state proportion value and the smoldering state proportion value are greater than or equal to the threshold values.

If there is cloud cover over the detection target, the radiance from the heat source may be blocked, and the heat source proportion value may not be accurately calculated. Accordingly, the determination unit 323 may determine the occurrence of a fire according to a change rate of each of the flaming state proportion values and the smoldering state proportion values in time series stored in the storage unit 322.

For example, the determination unit 323 calculates an average value of the flaming state proportion values in time series and an average value of the smoldering state proportion values in time series, stored in the storage unit 322 for each fixed interval. Then, the determination unit 323 calculates the change rate of the average value calculated for each fixed interval. The change rate includes, for example, a difference between the average value of the current interval and the average value of the previous interval, or a value obtained by dividing a difference between the average value of the current interval and the average value of the previous interval by the average value of the current interval. The determination unit 323 determines that a fire has occurred when the change rate of the average value of the flaming state proportion values calculated for each fixed interval exceeds a threshold value (a first change rate threshold value). In addition, the determination unit 323 determines that a fire has occurred when the change rate of the average value of the smoldering state proportion values calculated for each fixed interval exceeds a threshold value (a second change rate threshold value). That is, the determination unit 323 calculates the average value in the fixed interval obtained by averaging, for each fixed interval, the heat source proportion values in time series stored in the storage unit 322 and determines that a heat source is present when the change rate of the calculated average value exceeds a change rate threshold value. Note that the first change rate threshold value and the second change rate threshold value change may be different from or the same as each other. Furthermore, it may be determined that a fire has occurred when the change rate of the average value of the flaming state proportion values or the smoldering state proportion values exceeds the threshold value a plurality of times continuously.

When the determination unit 323 has determined that a fire has occurred, the identification unit 324 predicts the fire area and scale of the fire. For example, the identification unit 324 identifies the pixel observation data by which the occurrence of a fire has been determined, and identifies the detection area corresponding to the identified pixel as the fire area. In addition, when the determination unit 323 has determined that a fire has occurred, the identification unit 324 identifies the scale of the fire area based on the flaming state proportion value or the smoldering state proportion value.

Figure 4:
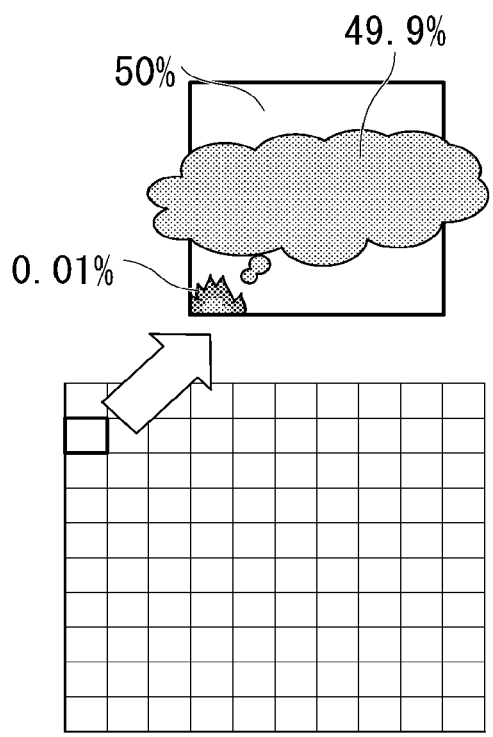
FIG. 4 is a diagram showing a method of identifying the scale of a fire in an identification unit of the embodiment of the present disclosure.
Figure 5:
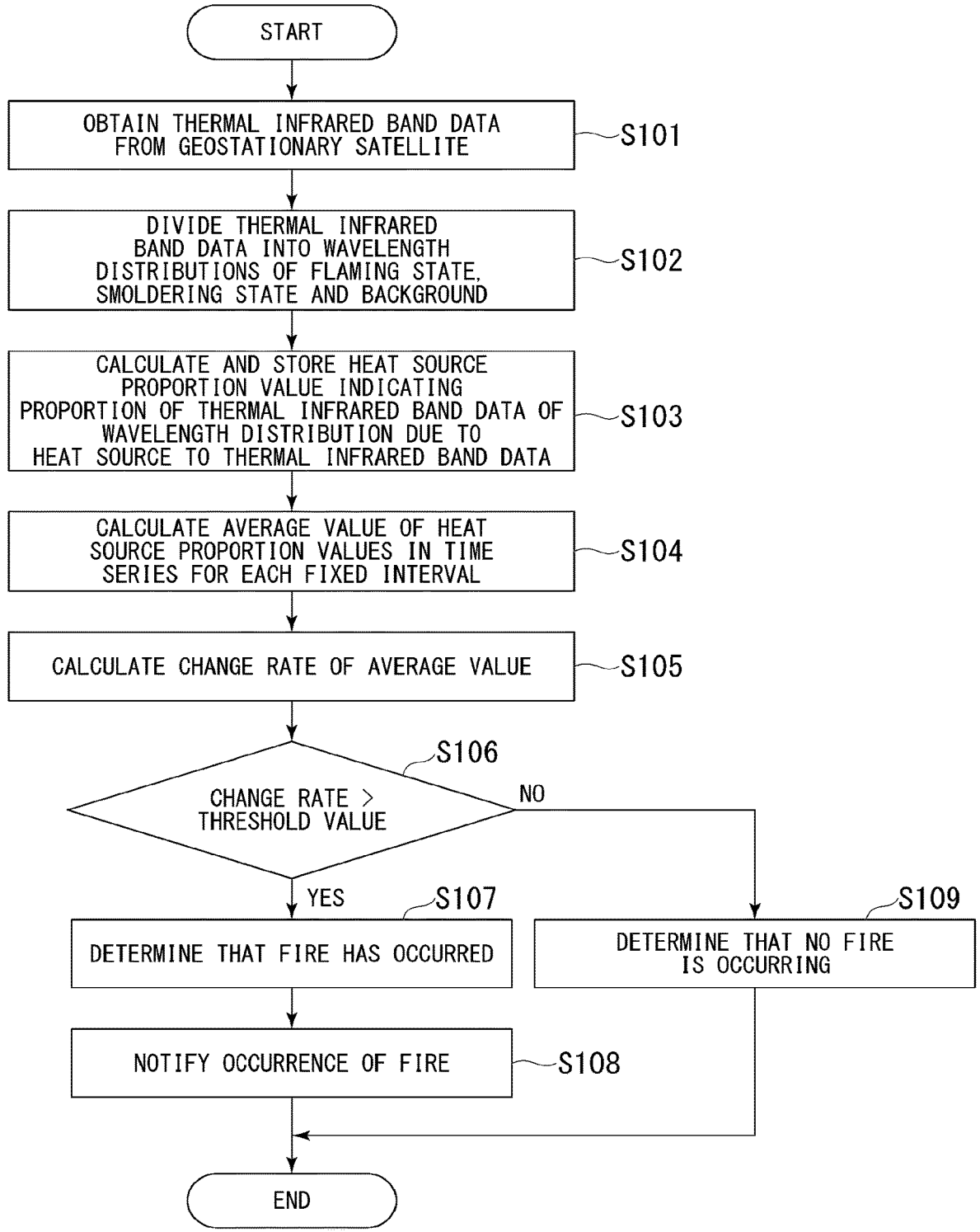
FIG. 5 is a flowchart showing an operation flow in the heat source detection device of the embodiment of the present disclosure.

For example, as shown in FIG. 4, when the flaming state proportion value is 0.01%, the smoldering state proportion value is 49.9%, the background proportion value is 50%, and the geostationary satellite 1 has a spatial resolution of 2×2 km, the identification unit 324 can identify 0.0004 km$^2$ (400 m$^2$) and 1.996 km$^2$ as the flaming state and the smoldering state, respectively, in the identified fire area of 2×2 km.

The display unit 33 displays an image showing the detection target (for example, a bird's eye view of the detection target) on a display screen, and when the detection unit 32 has determined that a fire has occurred, the display unit 33 displays denotation of the occurrence of the fire on the fire area identified by the identification unit 324 on the display screen. For example, the display unit 33 displays the fire area identified by the identification unit 324 on the display screen in a color different from that of a case where no fire is occurring.

The notification unit 34 notifies that the determination unit 323 has determined that a fire has occurred. Here, the notification may be through a social networking service (SNS) such as email or LINE (registered trademark), a buzzer, a voice, or lighting or blinking of a light-emitting diode (LED). In addition, when the determination unit 323 has determined that a fire has occurred, the notification unit 34 may notify a manager by transmitting information on the occurrence of the fire to the manager through wire or wireless transmission. The manager may be a manager who manages the heat source detection device 3 or be a manager who manages the fire area.

Hereinafter, the operation of the heat source detection device 3 of the embodiment of the present disclosure will be described with reference to FIGS. 5 to 7B. The heat source detection device 3 obtains observation data in the detection target from the geostationary satellite 1 via the data center 2 (step S101).

The heat source detection device 3 divides the observation data obtained from the geostationary satellite 1 into the wavelength distributions of the flaming state, the smoldering state and the background for each pixel (step S102). Then, the heat source detection device 3 calculates proportion values showing how much the divided wavelength distributions of the flaming state, the smoldering state and the background are included in the observation data obtained from the geostationary satellite 1 and stores the proportion values in the storage unit 322 in time series (step S103).

Here, the proportion value (the heat source proportion value) of the observation data of the wavelength distribution due to a heat source (for example, a fire) corresponds to the proportion values of the wavelength distributions of the flaming state and the smoldering state. Therefore, the occurrence of a fire is determined using each of the proportion values (the flaming state proportion value and the smoldering state proportion value) of the wavelength distributions of the flaming state and the smoldering state.

The heat source detection device 3 calculates, for each fixed interval, the average value of each of the flaming state proportion values and the smoldering state proportion values in time series stored in the storage unit 322 (step S104). Then, the determination unit 323 obtains the change rate of the average value calculated for each fixed interval (step S105).

Then, the heat source detection device 3 determines whether or not the change rate of the average value of each of the flaming state proportion values and the smoldering state proportion values calculated for each fixed interval exceeds a predetermined value (step S106). Then, the heat source detection device 3 determines that a fire has occurred when at least either one of the change rates of the average values of the flaming state proportion values and the smoldering state proportion values exceeds a threshold value (step S107) and makes note of this (step S108). On the other hand, the heat source detection device 3 determines that no fire is occurring when the change rate of the average value of the flaming state proportion values or the smoldering state proportion values does not exceed a threshold value (step S109).

Figure 6:
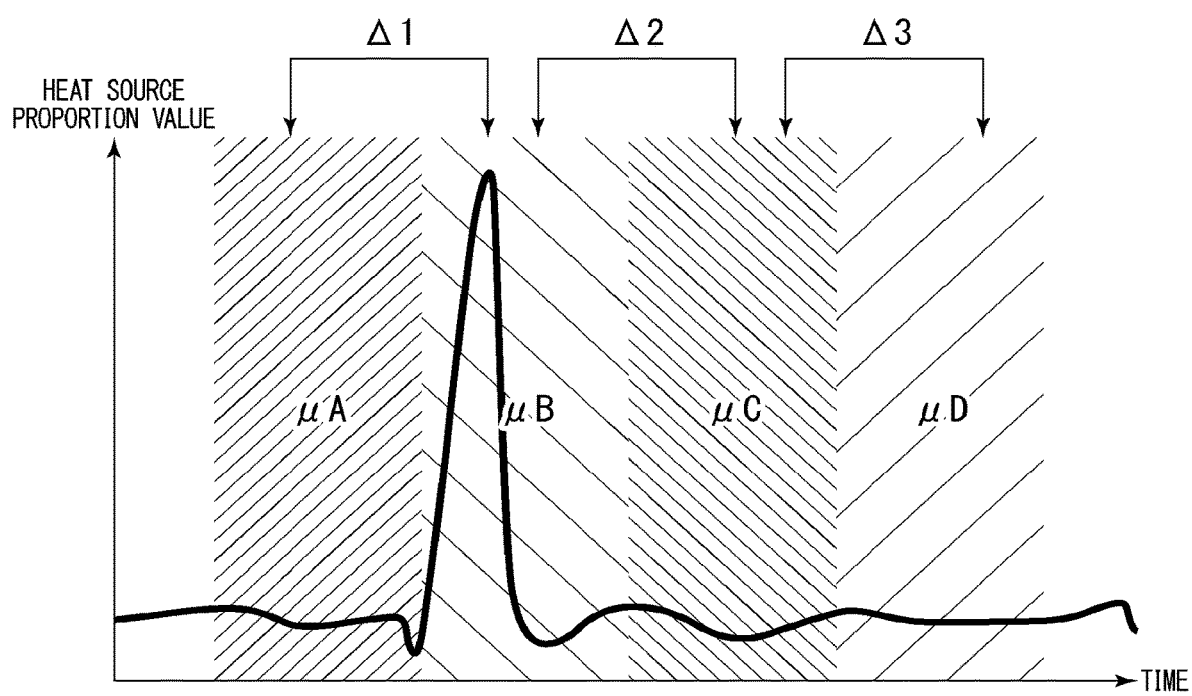
FIG. 6 is a diagram showing a method of calculating a change rate of an average value of heat source proportion values relating to the embodiment of the present disclosure.
Figure 7A:
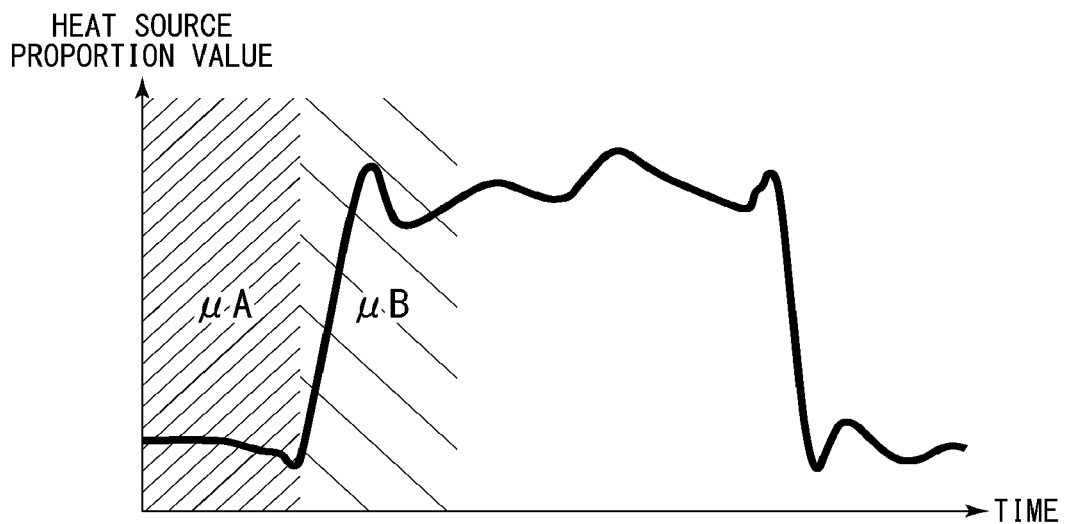
FIG. 7A is a diagram showing a method of determining the presence or absence of a fire in a determination unit of the embodiment of the present disclosure.
Figure 7B:
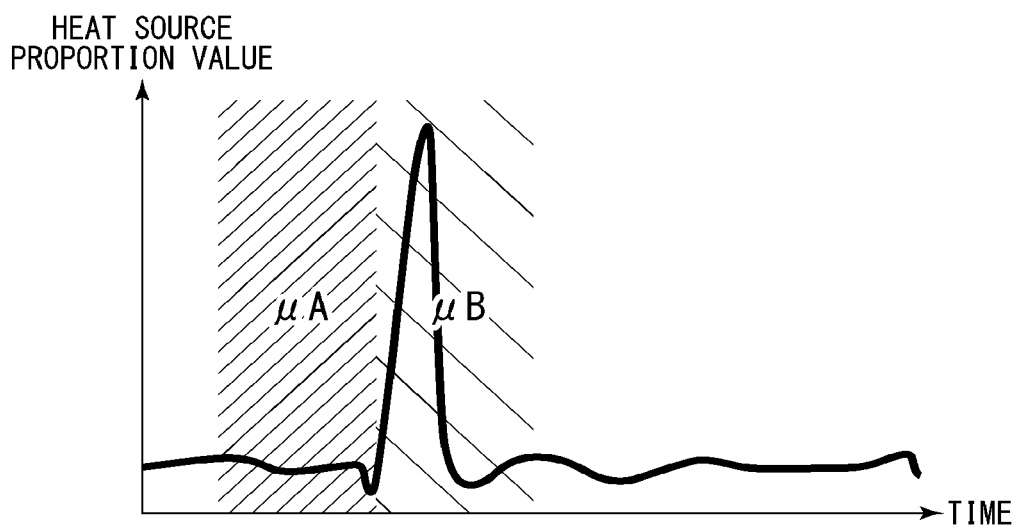
FIG. 7B is a diagram showing the method of determining the presence or absence of a fire in the determination unit of the embodiment of the present disclosure.

For example, as shown in FIG. 6, when the heat source detection device 3 calculates average values μA, μB, μC and D of the heat source proportion values for each fixed interval, the heat source detection device 3 calculates a change rate Δ1 from the average value μA to the average value μB, a change rate Δ2 from the average value μB to the average value μC, and a change rate Δ3 from the average value μC to the average value μD. Then, as shown in FIGS. 7A and 7B, when the change rate Δ1 from the average value μA to the average value μB is large (for example, when this change rate exceeds a threshold value), the heat source detection device 3 determines that a fire has occurred (FIG. 7A). On the other hand, as shown in the diagram, when the change rate Δ1 from the average value μA to the average value μB is small (for example, when this change rate does not exceed the threshold value), the heat source detection device 3 determines that no fire is occurring (FIG. 7B).

Hereinbefore, the embodiment of the present disclosure has been described in detail with reference to the drawings, but the specific configuration is not limited to this embodiment, and design changes and the like may be made within the scope of the present disclosure.

(Modification 1) In the above embodiment, when the determination unit 323 has determined that a fire has occurred, the notification unit 34 may notify the communication terminal of the manager of the information indicating the occurrence of the fire and of the fire area and scale of the fire identified by the identification unit 324. Thereby, when the manager receives the notification from the heat source detection device 3, the manager can immediately carry out fire-extinguishing actions on the fire area. In addition, the notification unit 34 may notify the communication terminal of the manager in charge of the fire area of how much of the flaming state and the smoldering state are included in the fire area. Thereby, the manager can carry out fire-extinguishing actions and evacuation instructions according to the state of the fire area.

(Modification 2) In the above embodiment, the determination unit 323 calculates an average value in a fixed interval by averaging the heat source proportion values in time series stored in the storage unit 322 for each fixed interval, but the present disclosure is not limited to this. For example, the determination unit 323 may perform moving average or weighted average adjustment on the heat source proportion values in time series stored in the storage unit 322. In this case, the determination unit 323 determines that a fire has occurred when an average value obtained by performing the moving average or the weighted average adjustment on the heat source proportion values in time series stored in the storage unit 322 or the change rate of the above average value exceeds a predetermined threshold value. In addition, the determination unit 323 may calculate a median or a mode of the heat source proportion values in time series stored in the storage unit 322 for each fixed interval. In this case, the determination unit 323 determines that a fire has occurred when the median or the mode exceeds a predetermined threshold value.

As described above, the heat source detection device 3 calculates the proportion (the heat source proportion value) of the wavelength distribution due to a heat source included in the observation data transmitted from the geostationary satellite 1 to the observation data by curve fitting using Planck's law. Then, the heat source detection device 3 determines the presence or absence of the heat source according to the calculated heat source proportion value.

When adopting such a configuration, even if the spatial resolution of the observation data from the geostationary satellite 1 is low, it is possible to frequently monitor fires in a detection area narrower than the spatial resolution. Therefore, the heat source detection device 3 can detect small-scale fires at an early stage.

The heat source detection device 3 of this embodiment may be configured by installing a program recorded in a computer-readable recording medium therein, the program being for performing various processes relating to control of calculating a heat source proportion value by curve fitting using Planck's law and control of determining the presence or absence of a heat source, and by causing a computer to execute the program. That is, the heat source detection device may be configured by causing a computer to execute a program that performs various processes relating to control of calculating a heat source proportion value by curve fitting using Planck's law and control of determining the presence or absence of a heat source, and by serving the computer as each unit included in the heat source detection device 3.

The computer includes a CPU, various memories such as a ROM, a RAM and an EEPROM (registered trademark), a communication bus and an interface and serves as the heat source detection device 3 by the CPU reading processing programs stored in the ROM as firmware in advance and sequentially executing the processing programs.

In the above embodiment, the calculation unit 321 divides the distribution of the radiance wavelength by curve fitting using the non-linear least squares method into three wavelength distributions of the flaming state, the smoldering state and the background, but the present disclosure is not limited to this, and the calculation unit 321 may divide the distribution of the radiance wavelength by curve fitting using the non-linear least squares method into two wavelength distributions of the firing state (including the flaming state and the smoldering state) and the background.

The invention claimed is:

1. A heat source detection device that detects a heat source on the earth using observation data of a radiometer provided in a geostationary satellite, the heat source detection device comprising:
    a calculation unit that calculates a heat source proportion value indicating a proportion of a wavelength distribution due to the heat source included in the observation data to the observation data by curve fitting using Planck's law; and
    a determination unit that determines presence or absence of the heat source according to the heat source proportion value calculated by the calculation unit,
    wherein the calculation unit sets a first wavelength distribution D1, a second wavelength distribution D2 and a third wavelength distribution D3 based on predetermined temperatures determined according to a flaming state, a smoldering state and a background, respectively, calculates coefficients a, b and c satisfying a radiance G of the observation data=aD1+bD2+cD3 using a non-linear least squares method and sets the heat source proportion value to a/(a+b+c), b/(a+b+c) or c/(a+b+c).

2. The heat source detection device according to claim 1, wherein the calculation unit calculates, as the heat source proportion value, a proportion of a wavelength distribution depending on a temperature of a heat source by a fire with flames to the observation data, and a proportion of a wavelength distribution depending on a temperature of a heat source by a fire only with smoke to the observation data.

3. The heat source detection device according to claim 1, further comprising:
a storage unit that stores, in time series, heat source proportion values calculated by the calculation unit, wherein
the determination unit determines that the heat source is present when a change rate of the heat source proportion values in time series stored in the storage unit exceeds a threshold value.

4. The heat source detection device according to claim 1, wherein the calculation unit calculates an esf by performing curve fitting using the non-linear least squares method, and until a difference between a radiance based on the calculated esf and the radiance G of the observation data converges on a fixed value or less, while adjusting the predetermined temperatures, the calculation unit repeats this procedure.

5. The heat source detection device according to claim 2, further comprising:
a storage unit that stores, in time series, heat source proportion values calculated by the calculation unit, wherein
the determination unit determines that the heat source is present when a change rate of the heat source proportion values in time series stored in the storage unit exceeds a threshold value.

6. The heat source detection device according to claim 3, wherein the determination unit calculates an average value in a fixed interval obtained by averaging, for each fixed interval, the heat source proportion values in time series stored in the storage unit and determines that the heat source is present when a change rate of the calculated average value exceeds a threshold value.

7. The heat source detection device according to claim 5, wherein the determination unit calculates an average value in a fixed interval obtained by averaging, for each fixed interval, the heat source proportion values in time series stored in the storage unit and determines that the heat source is present when a change rate of the calculated average value exceeds a threshold value.

* * * * *